Oct. 26, 1937.     F. C. WAPPLER     2,096,831
STERILIZABLE PRESSURE GAUGE
Filed May 28, 1936
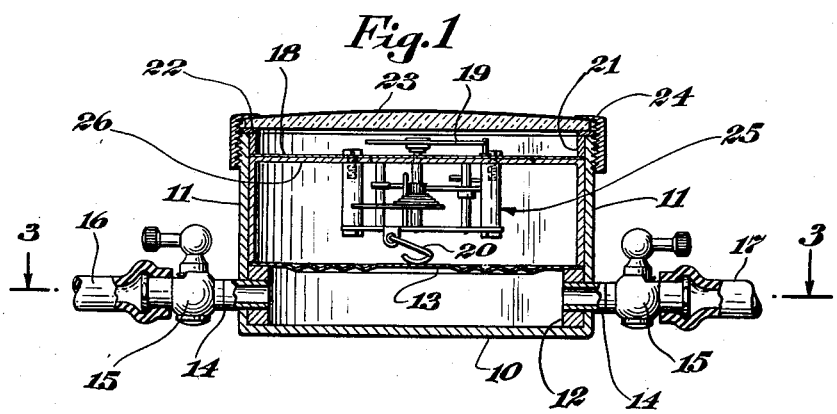
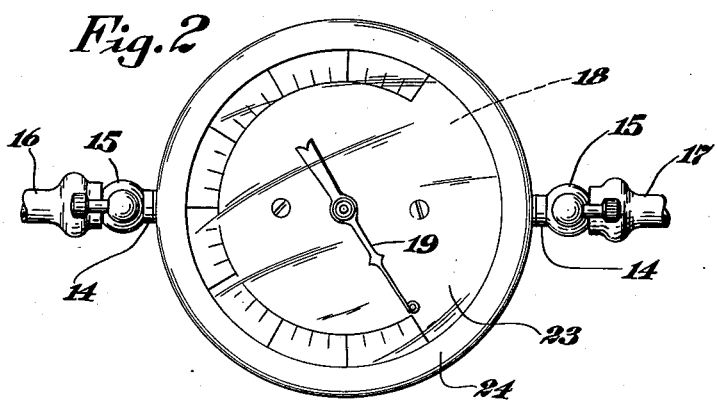
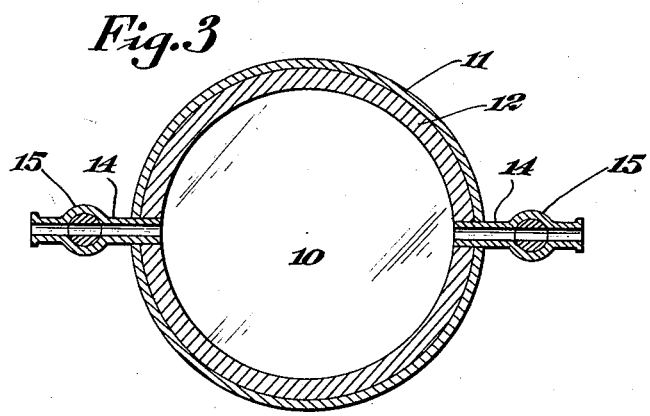
INVENTOR,
Frederick Charles Wappler,
BY
Frederick Breitenfeld
ATTORNEY.

Patented Oct. 26, 1937

2,096,831

UNITED STATES PATENT OFFICE 2,096,831

STERILIZABLE PRESSURE GAUGE

Frederick Charles Wappler, New York, N. Y.

Application May 28, 1936, Serial No. 82,211

2 Claims. (Cl. 73—110)

My present invention relates generally to pressure gauges, and has particular reference to certain structural improvements which permit the gauge to be sterilizable in its entirety.

While the novel features of my invention relate generically to the art of measuring a fluid pressure by means of a diaphragm gauge, the objects of my present invention, and the advantageous characteristics of the present improved device, can be best explained by referring briefly to the purposes for which the gauge is designed.

For diagnostic or therapeutical purposes, it is frequently desirable for a surgeon to measure intravesical pressure, i. e., the fluid pressure within the bladder. For example, in order properly to diagnose and subsequently prescribe treatment for a neurogenous bladder, it is necessary to investigate and study the differing responses of the bladder to varying quantities of fluid contained within it. Customary practice has resorted to the use of a U-tube mercury manometer, and the procedure that is involved is rather cumbersome and complicated. Thus, numerous rubber-tube connections must be properly established and provided for; a relatively large number of valves must be properly manipulated; provision must be made for suitably supporting the U-tube manometer; corrections must be made for the static head which varies with the position of the manometer; and, of primary importance, the apparatus must be capable of thorough sterilization.

So far as I know, the measurement of intravesical pressure has never heretofore been capable of accomplishment by the use of the ordinary type of pressure gauge.

In accordance with my present invention, a gauge of the diaphragm type is constructed in a novel and special manner, whereby its use for the purpose mentioned and analogous purposes is rendered entirely feasible. The outstanding advantageous characteristic of the present gauge is that it is sterilizable in its entirety, permitting thorough and reliable sterilization of all interior parts which come in contact with contaminating fluid.

Briefly, my invention resides in the provision of a fluid-tight casing in which a diaphragm is arranged in fluid-tight relation, thereby dividing the case into two mutually sealed compartments. Gauge mechanism is arranged in one of the compartments, and the other compartment is provided with inlet and outlet openings for the fluid whose pressure is to be measured. A characterizing feature of the present improved construction lies in the fact that the last-named compartment is substantially coextensive in cross-sectional area with the diaphragm, so that a sterilizing fluid will have free access to the entire interior of said compartment.

I achieve the foregoing objects, and such other objects as may hereinafter appear or be pointed out, in the manner illustratively exemplified in the accompanying drawing, wherein—

Figure 1 is a vertical cross-sectional view through a pressure gauge constructed in accordance with my present invention;

Figure 2 is a plan view of the gauge; and

Figure 3 is a cross-sectional view taken substantially along the line 3—3 of Figure 1.

In the preferred embodiment herein illustrated, a fluid-tight casing is provided, of substantially cylindrical cross-sectional shape, the body of which is composed of polished metal or its equivalent. The body of the casing has a substantially circular bottom wall 10 and integral side walls 11, the latter being threaded on their exterior edges adjacent to the upper edge.

Within the angle between the bottom and side walls I mount a ring 12, preferably of metal, the ring being soldered or otherwise firmly secured into position in a fluid-tight manner. A substantially circular diaphragm 13 is arranged transversely across the casing with its periphery supported in fluid-tight relation on the ring 12, this being accomplished by soldering or otherwise firmly securing the periphery of the diaphragm 13 to the ring 12.

This arrangement of the diaphragm 13 divides the casing into two mutually sealed compartments. The lower one, i. e., between the diaphragm and the bottom wall 10, is the one through which the fluid is passed whose pressure is to be measured. To permit the inlet and outlet of this fluid, a pair of opposed openings are provided in the side wall 11, these openings extending through the ring 12 and being adapted to receive the inner ends of connection nipples 14. The latter are preferably fitted into the openings in a removable but fluid-tight manner. The nipples 14 also preferably embody valves or petcocks 15, and the outer ends are constructed to permit the removable application of rubber tubes 16 and 17.

Within the upper compartment of the casing, gauge mechanism is arranged, and this mechanism is designated in a general manner by the reference numeral 25. It is mounted upon a shell 26 which rests upon the periphery of the diaphragm 13 and which carries a dial 18. The mechanism includes a pointer 19 which moves over the dial in response to deflections of the diaphragm 13, the mechanism being responsive to these deflections by virtue of the contact with the diaphragm of the actuating element 20.

A ring 21 helps to hold the shell 17 in position. A fluid-tight gasket 22 supports a glass or otherwise transparent top wall 23; and the latter is held in position by an interiorly threaded rim 24 which engages with the threads on the side walls 11. In applying the rim 24, cement or other suitable material is employed so that the joint is entirely fluid-tight.

In using the present gauge, the tube 16 is connected with a suitable source of fluid, such as water, the same being preferably accommodated in a container which is so constructed that the amounts of water drawn from the container may be accurately indicated or measured. The tube 17 is connected with a catheter, and the catheter extends through the urethra into the bladder. During the measuring procedure, the patient lies on his or her back, and the gauge is sufficiently light to permit it to be rested directly upon the abdomen of the patient.

One of the advantages of the present construction lies in the fact that the auxiliary apparatus involves nothing more than that which has been referred to. No extensive or complicated tubes are needed; only the simplest valve manipulations are required; and the difficulties heretofore encountered with respect to the support of the U-tube manometer or corrections for its readings, are entirely obviated.

Of primary importance and advantage is the fact that the present device is completely and readily sterilizable. All that is required is to disconnect the tubes 16 and 17, preferably along with the nipples 14, and thereupon to place the gauge in its entirety into the sterilizing chamber or fluid. By virtue of the fact that the fluid compartment of the gauge is substantially coextensive in cross-sectional area with that of the diaphragm, there are no pockets or crevices which can possibly escape the action of the sterilizing fluid, or in which air or contaminating fluid or material can possibly lodge. The casing being entirely fluid-tight, and the compartment in which the gauge mechanism is arranged being sealed in fluid-tight relation to the lower compartment, the gauge mechanism and all its associated parts remain unaffected and uncontacted by the sterilizing fluid.

After sterilization, the gauge may be immediately reused by simply reinserting it into the fluid system.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to claim by Letters Patent is—

1. A sterilizable pressure gauge, comprising a cylindrical fluid-tight casing having integral bottom and side walls, a ring in the casing secured in fluid-tight relation within the angle between the bottom and side walls, a diaphragm extending transversely across the casing and having its periphery supported in fluid-tight relation on said ring, whereby the casing is divided into two mutually sealed compartments, gauge mechanism in the upper compartment and actuated by said diaphragm, and the lower compartment having opposed inlet and outlet openings extending through said ring for the fluid whose pressure is to be measured, whereby the gauge may be subjected in its entirety to a sterilizing fluid which will have free access to the entire interior of said lower compartment.

2. A sterilizable pressure gauge for measuring intravesical pressure, comprising a cylindrical casing having integral bottom and side walls, a ring in the casing secured in fluid-tight relation within the angle between the bottom and side walls, a diaphragm extending transversely across the casing and having its periphery supported in fluid-tight relation on said ring, whereby the casing is divided into two mutually sealed compartments, gauge mechanism arranged in its entirety within the upper compartment and actuated by said diaphragm, a transparent cover on said upper compartment mounted in fluid-tight relation on the upper edge of the side wall of the casing, and the lower compartment having opposed inlet and outlet openings extending through said ring to permit ingress and egress of the fluid whose pressure is to be measured, whereby the gauge may be subjected bodily and in its entirety to a sterilizing fluid which is barred against entry into the upper compartment but has free access to the entire interior of said lower compartment.

FREDERICK CHARLES WAPPLER.